(12) United States Patent
Wu (10) Patent No.: US 8,902,053 B2
(45) Date of Patent: Dec. 2, 2014

(54) METHOD AND SYSTEM FOR LANE DEPARTURE WARNING

(75) Inventor: Yi-Ta Wu, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 262 days.

(21) Appl. No.: 13/424,378

(22) Filed: Mar. 20, 2012

(65) Prior Publication Data

US 2013/0120125 A1  May 16, 2013

(30) Foreign Application Priority Data

Nov. 16, 2011  (TW) .............................. 100141853 A (51) Int. Cl.
| | | |
|---|---|---|
| B60Q 1/00 | (2006.01) | |
| G06K 9/00 | (2006.01) | |
| G08G 1/16 | (2006.01) | |

(52) U.S. Cl.
CPC ............ *G06K 9/00798* (2013.01); *G08G 1/167* (2013.01)
USPC ............................ 340/438; 340/439; 382/104

(58) Field of Classification Search
CPC .... G06K 9/00; G06K 9/4633; G06K 9/00798
USPC .......................................... 340/439, 437, 576
See application file for complete search history.

(56) References Cited

U.S. PATENT DOCUMENTS

| | | | |
|---|---|---|---|
| 5,530,420 A | 6/1996 | Tsuchiya et al. | |
| 5,689,249 A | 11/1997 | Sakamoto et al. | |
| 6,489,887 B2 | 12/2002 | Satoh et al. | |
| 7,539,566 B2 | 5/2009 | Tange et al. | |

(Continued)

FOREIGN PATENT DOCUMENTS

| | | |
|---|---|---|
| CN | 1945596 | 4/2007 |
| CN | 101202905 | 6/2008 |

(Continued)

OTHER PUBLICATIONS

Lin et al., "Upgrading the Capability of a Vision-based Vehicle Lane-Departure and Forward-Collision Warning System", International Symposium on Advanced Vehicle Control (AVEC), 2008, pp. 497-502.

Lin et al., "Design a Support Vector Machine-based Intelligent System for Vehicle Driving Safety Warning", 11th International IEEE Conference on Intelligent Transportation Systems, Oct. 12-15, 2008, pp. 938-943.

(Continued)

*Primary Examiner* — Daniel Wu
*Assistant Examiner* — Frederick Ott
(74) *Attorney, Agent, or Firm* — Jianq Chyun IP Office (57) ABSTRACT

A method and a system for lane departure warning are provided. The method is as follows. An original image is segmented into a plurality of regional images. Next, characteristics of each regional image are analyzed, and accordingly non-lane line regions are removed from the regional images, so as to obtain a plurality of lane line candidates. Then, a plurality of lane lines are determined from the lane line candidates according to a location of each lane line candidate in the original image. Finally, the lane lines are distinguished into left lane lines and right lane lines, and a variation of an angle between each left lane line and a horizontal line and a variation of an angle between each right lane line and the horizontal line are analyzed, so as to judge whether a vehicle departs from a lane and send a lane departure warning.

18 Claims, 7 Drawing Sheets

(56) References Cited

U.S. PATENT DOCUMENTS

| | | | |
|---|---|---|---|
| 7,746,221 B2 | 6/2010 | Jung | |
| 7,920,721 B2 | 4/2011 | Unoura | |
| 2003/0103650 A1* | 6/2003 | Otsuka et al. | 382/104 |
| 2005/0273261 A1* | 12/2005 | Niwa et al. | 701/301 |
| 2008/0317282 A1* | 12/2008 | Unoura | 382/103 |
| 2009/0041303 A1* | 2/2009 | Aoki et al. | 382/104 |
| 2011/0110598 A1 | 5/2011 | Wu | |

FOREIGN PATENT DOCUMENTS

| | | |
|---|---|---|
| CN | 101804814 | 8/2010 |
| EP | 1320072 | 6/2003 |
| TW | 200518963 | 6/2005 |
| TW | I270827 | 1/2007 |
| TW | 200910038 | 3/2009 |
| TW | 200922816 | 6/2009 |
| TW | I320547 | 2/2010 |
| TW | I334517 | 12/2010 |

OTHER PUBLICATIONS

"Office Action of Taiwan Counterpart Application", issued on Nov. 13, 2013, p. 1-p. 4.

Yu et al., "A Lane Departure Warning System Based on Machine Vision," 2008 IEEE Pacific-Asia Workshop on Computational Intelligence and Industrial Application, Dec. 19-20, 2008, pp. 197-201.

Song et al., "Dynamic Calibration of Pan-Tilt-Zoom Cameras for Traffic Monitoring," IEEE Transactions on Systems, Man, and Cybernetics, Part B: Cybernetics, Oct. 2006, pp. 1091-1103, vol. 36, Issue 5.

Sun et al., "HSI color model based lane-marking detection," 2006 IEEE Intelligent Transportation Systems Conference, Sep. 17-20, 2006, pp. 1168-1172.

"Office Action of China Counterpart Application", issued on Jul. 9, 2014, p. 1-p. 10.

* cited by examiner

METHOD AND SYSTEM FOR LANE DEPARTURE WARNING

CROSS-REFERENCE TO RELATED APPLICATION

This application claims the priority benefit of Taiwan application serial no. 100141853, filed on Nov. 16, 2011. The entirety of the above-mentioned patent application is hereby incorporated by reference herein and made a part of this specification.

BACKGROUND

1. Technical Field

The disclosure relates to a method and a system for lane departure warning.

2. Related Art

The research and development of systems for lane departure warning mainly include two projects, namely, "lane line detection" and "lane departure detection". Although the research has a history of more than 10 years with many famous scholars devoted to the research in this field, the research results still need to be improved.

Lane line detection algorithms at the present stage include edge detection algorithms and line detection algorithms, and are mainly applied in detecting manual lane markers. Edge detection is one of common techniques for detecting lane markers.

Figure 1:
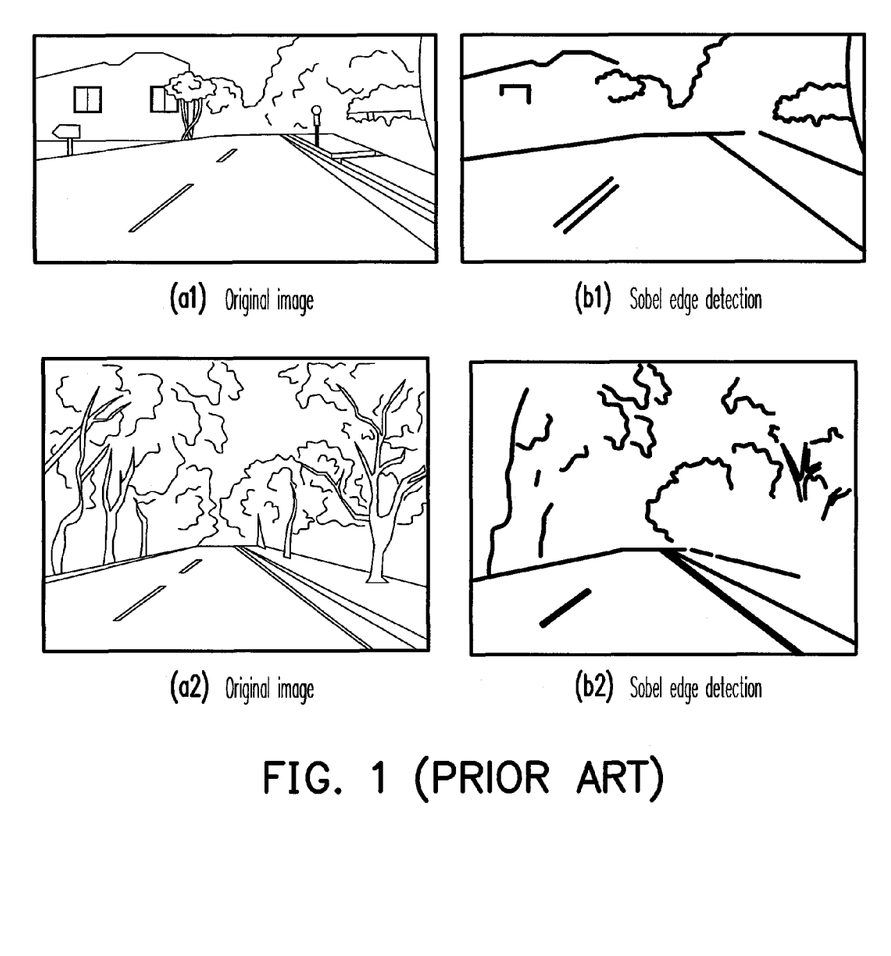

FIG. 1(a1) to FIG. 1(b2) show examples of conventional edge detection. FIG. 1(a1) and FIG. 1(a2) show original images; and FIG. 1(b1) and FIG. 1(b2) respectively show results obtained by performing edge detection on the original images in FIG. 1(a1) and FIG. 1(a2). The brightness of pixels represents the intensity of an edge (the darker the color, the higher the intensity of the edge). Therefore, in actual application, a threshold needs to be set to classify pixels into edge pixels and non-edge pixels to facilitate subsequent steps of a lane detection algorithm, but the setting of such a threshold is very difficult.

The conventional edge detection algorithms need to be improved in many parts. First, although edge pixels can be detected using the edge detection method, the detected edge is just the edge of a lane marker, thereby causing a result of a hollow line (that is, the center of the lane marker is judged as non-edge pixels); therefore, some additional steps are required to avoid such result. Second, in the same image, some lane markers with brightness gradient varying sharply can be easily detected, while those lane markers with brightness gradient varying non-obviously cannot be detected using the conventional edge detection algorithms. Third, in order to process "short lane lines", the conventional edge detection algorithm needs additional pre-processing steps to ensure the ability of detecting "short lane lines". For example, the image overlapping technology can be used to extend "short lane lines" by overlapping a plurality of images. In this way, erroneous detection can be reduced.

Figure 2:
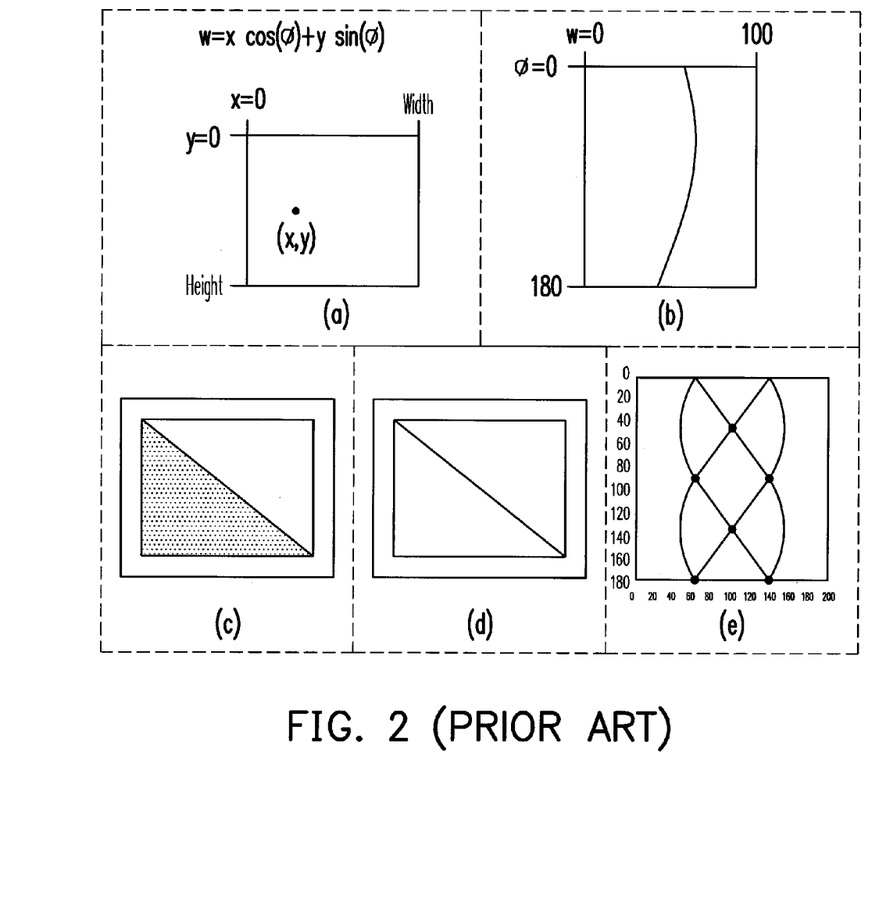

FIG. 2(a) to FIG. 2(e) show an illustrative example of a conventional line detection method. FIG. 2(a) shows a point (x,y) in two-dimensional space on which coordination conversion is performed according to the following formula (1):

$$w = x \cos(\phi) + y \sin(\phi) \tag{1}$$

In the coordinate conversion formula, since x and y are known numbers, for each different variable $\phi$ (from 0° to 180°), the corresponding value of w can be calculated, thus obtaining the cumulative matrix in FIG. 2(b). Therefore, each point in xy space can be converted into a curve in w$\phi$ space, and the number of curves with intersection points can be represented as the number of edge points of straight lines in xy coordinates. FIG. 2(c) shows an original image, FIG. 2(d) shows the result of implementing edge detection on FIG. 2(c), and FIG. 2(e) shows the result of a cumulative matrix obtained after implementing transform on each edge point in FIG. 2(d).

It can be clearly found from FIG. 2(e) that there are five bright points (points with the most curves passing through), thereby judging that there are five straight lines in the picture. Although the number of straight lines in the image can be known, the region corresponding to each straight line cannot be further known. That is because in actual environment, the conventional line detection method can provide information on a straight line, but cannot further provide whether the straight line is a "non-lane line".

A current lane departure algorithm needs to analyze a plurality of continuous frames, and accordingly find a displacement direction of a lane line, so as to judge whether a vehicle departs. By analyzing the variation of a lane line and left and right boundaries, a moving direction of the vehicle can be judged.

Since the existing lane departure algorithm needs to analyze a plurality of continuous frames to judge the moving direction of the vehicle, a certain time delay exists before the result of lane departure detection is obtained, which is also a problem in requirements for real time.

To sum up, since the conventional lane line detection algorithm cannot predict, in lane line detection, the degree of color difference (gradient) between the lane line and the road, all types of lane lines cannot be detected using parameters preset in the algorithm. In addition, to strengthen characteristics of the lane line, a plurality of continuous frames always needs to be overlapped to lengthen the lane line. Finally, since the used line detection algorithm cannot provide whether the straight line is a lane line or a non-lane line, in the conventional lane departure system, a manually set frame is required, and possible lane line regions need to be marked, so as to filter out non-road lines. In lane departure detection, the conventional lane departure system needs to analyze the variation of continuous frames to judge whether the vehicle departs. In this way, the system cannot notify the driver of information on lane departure in real time.

SUMMARY

In view of the above, the disclosure is directed to a method and a system for lane departure warning, which are capable of detecting various types of lane lines and judging whether a vehicle departs through just one frame.

A method for lane departure warning is introduced herein, which is applicable to an electronic device. The method is as follows. An original image is segmented into a plurality of regional images. Next, characteristics of each regional image are analyzed, and accordingly at least one non-lane line region is removed from the regional images, so as to obtain a plurality of lane line candidates. Then, a plurality of lane lines is determined from the lane line candidates according to a location of each lane line candidate in the original image. Finally, the lane lines are distinguished into at least one left lane line and at least one right lane line, a variation of an angle between each left lane line and a horizontal line and a variation of an angle between each right lane line and the horizontal line are analyzed, so as to judge whether the electronic device departs from a lane, and send a lane departure warning.

A system for lane departure warning is introduced herein, which includes an image segmentation module, a lane line region detection module, a lane line determination module, a lane departure judgment module, and a warning module. The image segmentation module is used for segmenting an original image into a plurality of regional images. The lane line region detection module is used for analyzing characteristics of each regional image, and accordingly removing non-lane line regions from the regional images, so as to obtain a plurality of lane line candidates. The lane line determination module determines a plurality of lane lines from the lane line candidates according to a location of each lane line candidate in the original image. The lane departure judgment module distinguishes the lane lines into left lane lines and right lane lines, and analyzes a variation of an angle between each left lane line and a horizontal line and a variation of an angle between each right lane line and the horizontal line, so as to judge whether departure from a lane occurs. The warning module sends a lane departure warning when the lane departure judgment module judges that departure from the lane occurs.

Based on the above, in the disclosure, with the method and the system for lane departure warning in combination with the result of fast image segmentation, various types of lane lines can be detected; meanwhile, in the disclosure, it can be judged whether the vehicle departs through just one frame without analyzing the variation of continuous frames.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1(*a*1) to FIG. 1(*b*2) show examples of conventional edge detection.

FIG. 2(*a*) to FIG. 2(*e*) show an illustrative example of a conventional line detection method.

FIG. 5(*a*) to FIG. 5(*d*) show an example of image segmentation according to an embodiment of the disclosure.

DETAILED DESCRIPTION OF DISCLOSED EMBODIMENTS

In the disclosure, image segmentation is performed on an original image, and then, the result obtained after image segmentation and gradient analysis are combined to implement lane line region detection. Further, in the disclosure, characteristics of each of the lane line regions are analyzed so as to remove non-lane line regions and determine lane lines, and finally whether a vehicle departs from a lane line is judged according to a variation of angles of left and right lane lines, and a warning is sent, thereby achieving the effect of lane departure warning.

Figure 3:
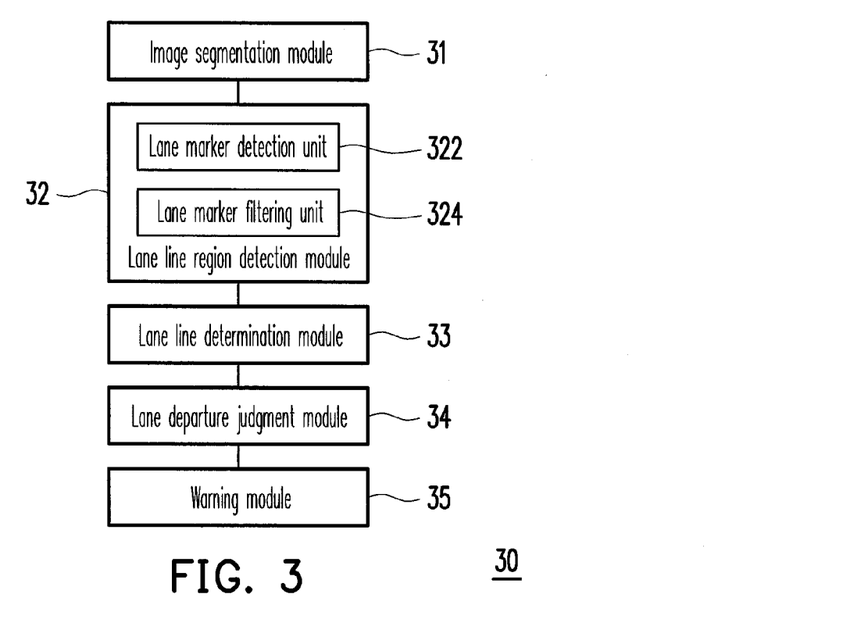
FIG. 3 is a block diagram of a system for lane departure warning according to an embodiment of the disclosure.
Figure 4:
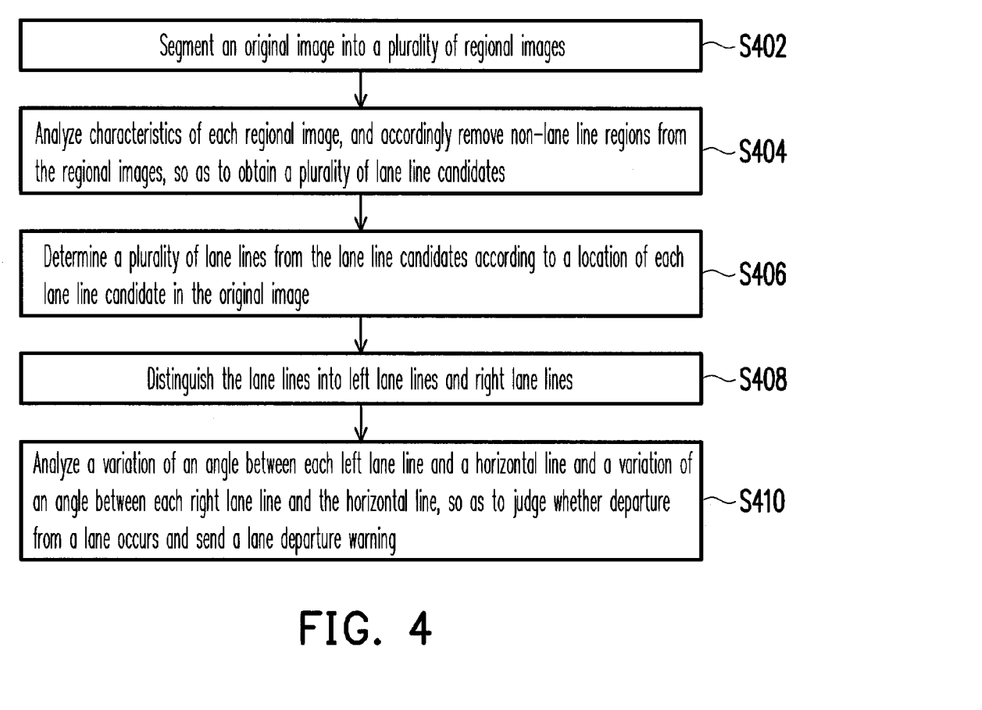
FIG. 4 is a flow chart of a method for lane departure warning according to an embodiment of the disclosure.

FIG. 3 is a block diagram of a system for lane departure warning according to an embodiment of the disclosure. FIG. 4 is a flow chart of a method for lane departure warning according to an embodiment of the disclosure. Referring to FIG. 3 and FIG. 4 at the same time, the warning system 30 in this embodiment is, for example, an electronic device such as a trip computer, a navigation device, or a drive recorder configured in a vehicle, and includes an image segmentation module 31, a lane line region detection module 32, a lane line determination module 33, a lane departure judgment module 34, and a warning module 35. The detailed steps of the method for lane departure warning in the disclosure are illustrated in combination with the various elements in the warning system 30.

First, the image segmentation module 31 receives an externally input original image, and segments the original image into a plurality of regional images (Step S402). The original image is, for example, an image of a road in front of the vehicle that is captured by an image capturing device such as a camera, a video camera, or a drive recorder configured in the vehicle, which at least includes a road surface on which the vehicle travels, being provided to the warning system 30 as a basis for judging whether the vehicle departs from a lane line. The above image capturing device, for example, may also be integrated into the warning system 30 to achieve the efficacy of shooting for immediate use and instant warning.

The image segmentation technology used by the image segmentation module 31 is, for example, a grouping method, in which first, a histogram illustrating distribution of pixel values of a plurality of pixels in the original image is calculated, then, a grouping process is performed on the histogram, and a grouping result of the histogram is restored to the original image, so as to obtain regional images after segmentation, thereby meeting the requirement of image regionalization.

Figure 5:
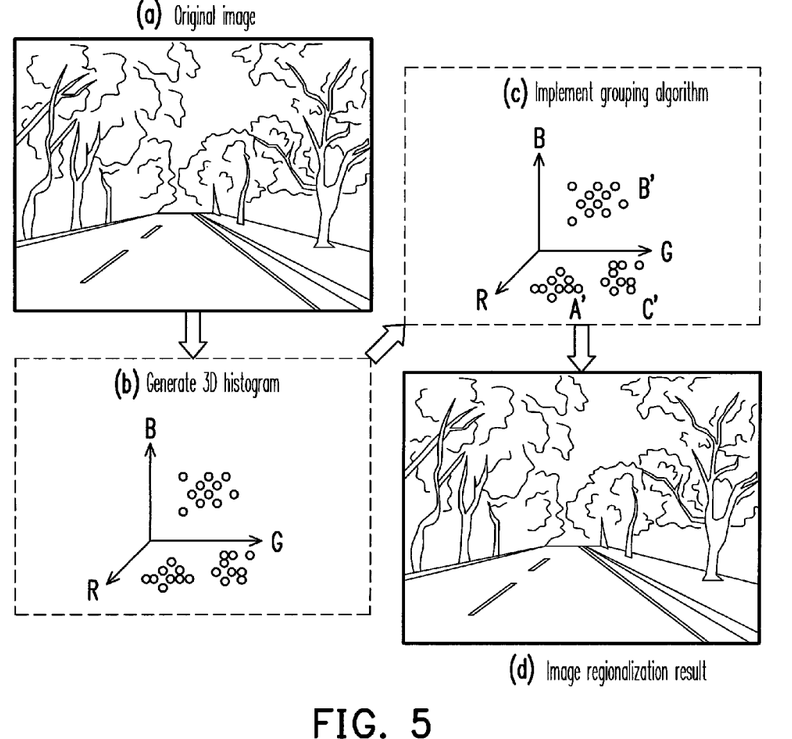

For example, FIG. 5(*a*) to FIG. 5(*d*) show an example of image segmentation according to an embodiment of the disclosure. FIG. 5(*a*) shows the original image received by the warning system. FIG. 5(*b*) shows a 3D histogram generated by pixel values of a plurality of pixels in the original image in FIG. 5(*a*). FIG. 5(*c*) shows the result obtained after implementing a grouping algorithm on FIG. 5(*b*), for example, three groups A', B', and C' are obtained. The result obtained after histogram grouping is restored to the original image to obtain a result of image regionalization, namely, a plurality of regional images shown in FIG. 5(*d*), in which each color represents a single group.

Referring back to FIG. 3, next, the lane line region detection module 32 analyzes characteristics of each of the regional images, and accordingly removes at least one non-lane line region from the regional images, so as to obtain a plurality of lane line candidates (Step S404). The lane line region detection module 32, for example, may further be divided into a lane marker detection unit 322 and a lane marker filtering unit 324.

The lane marker detection unit 322 is used for detecting lane markers in each regional image, and classifying the lane markers into a strong edge, a soft edge, or a non-edge according to a gradient value of each lane marker. Since the degree of difference between the lane markers in the original image and the road is unknown, a single gradient threshold cannot be used to capture all road markers in the original image. In order to solve this problem, in this embodiment, the image segmentation result and gradient analysis are combined to obtain the result of lane line detection.

Figure 6:
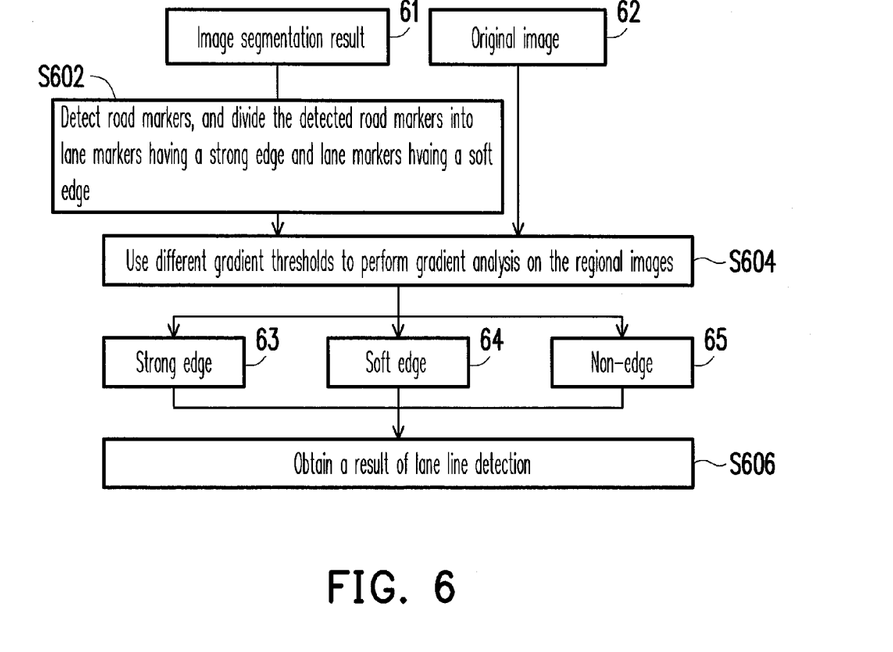
FIG. 6 is a flow chart of a lane line region detection method according to an embodiment of the disclosure.

In particular, FIG. 6 is a flow chart of a lane line region detection method according to an embodiment of the disclosure. Referring to FIG. 6, in this embodiment, after an image segmentation result 61 is received, road markers are detected, and divided into two categories: one category is lane markers of a strong edge, and the other category is lane markers of a soft edge (Step S602). Then, in the analysis of a variation of a gradient of pixels in the original image, different gradient thresholds may be used to perform gradient analysis on the regional images for the image segmentation result 61 and the different categories of lane markers in the original image 62 (Step S604), the lane markers are divided into three categories of a strong edge 63, a soft edge 64, and a non-edge 65, and finally, a result of lane line detection is obtained (Step S606).

On the other hand, the lane marker filtering unit 324 is used for analyzing at least one characteristic of the lane markers classified as the strong edge or the soft edge, and accordingly removing at least one non-lane line region from the lane markers, so as to obtain lane line candidates. In particular, to accelerate the performance of the system, this embodiment provides pre-processing steps of using lane line candidates for determination, so as to filter out some regions that cannot be lane lines.

Figure 7:
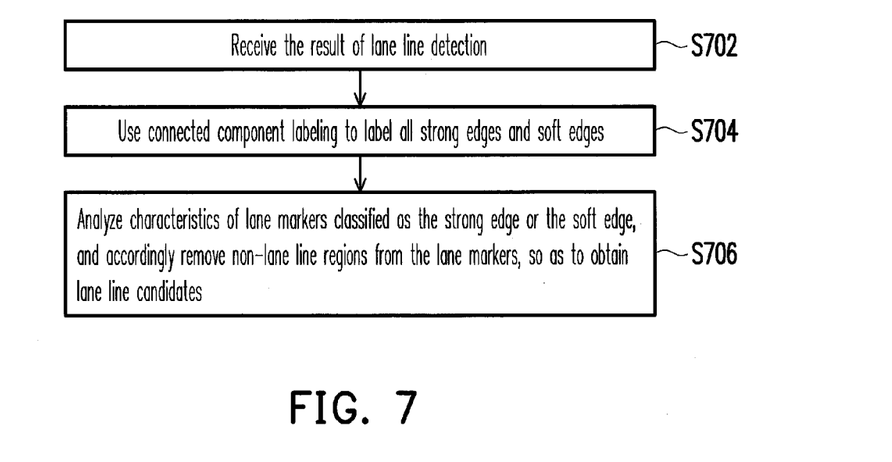
FIG. 7 is a flow chart of a lane line region detection method according to an embodiment of the disclosure.

For example, FIG. 7 is a flow chart of lane line region detection according to an embodiment of the disclosure. Referring to FIG. 7, in this embodiment, after the result of lane line detection is received (Step S702), connected component labeling is used to label all strong edges and soft edges (Step S704), in which all lane markers that are connected can be labeled as the same lane marker. Then, characteristics of lane markers classified as the strong edge or the soft edge are analyzed, and accordingly regions that cannot be lane lines are removed, so as to obtain lane line candidates (Step S706). The judgment is, for example, shown in the following formula (2):

$$R_i = \begin{cases} \text{lane line candidate,} & \text{if } ((\text{Max}(Wd(R_i), Ht(R_i))/\text{Min}(Wd((R_i), Ht(R_i))) \\ & > Th_{WD} \ \& \text{Size}(R_i)/(Wd(R_i) * Ht(R_i))) > Th_{Size}) \\ \text{non-lane line region,} & \text{else} \end{cases} \quad (2)$$

where $R_i$ is the $i^{th}$ region, $Wd(R_i)$ and $Ht(R_i)$ represent the width and height of $R_i$, $\text{Size}(R_i)$ represents a pixel number of $R_i$, and $Th_{WD}$, and $Th_{Size}$ are preset thresholds. In particular, in this embodiment, first, a first ratio of a maximum value to a minimum value in the width $Wd(R_i)$ and the height $Ht(R_i)$ of each lane marker is calculated, next, a second ratio of a pixel number $\text{Size}(R_i)$ of each lane marker to the width $Wd(R_i)$ and the height $Ht(R_i)$ is calculated. Then, it is judged whether the first ratio is greater than the threshold $Th_{WD}$ and whether the second ratio is greater than the threshold $Th_{Size}$. If the result of judgment is YES, it can be determined that the lane marker is a lane line candidate; on the contrary, if the result of judgment is NO, it is determined that the lane marker is a non-lane line region.

Referring back to FIG. 3, next, the lane line determination module 33 determines a plurality of lane lines from the lane line candidates according to a location of each lane line candidate in the original image (Step S406). In particular, the conventional lane line detection algorithm first detects edge pixels, and then uses Hough transform to detect straight lines in a frame. However, since actual locations of the straight lines cannot be detected using the Hough transform, the edge pixels in the upper part of the frame seriously cause errors in lane line determination.

Figure 8:
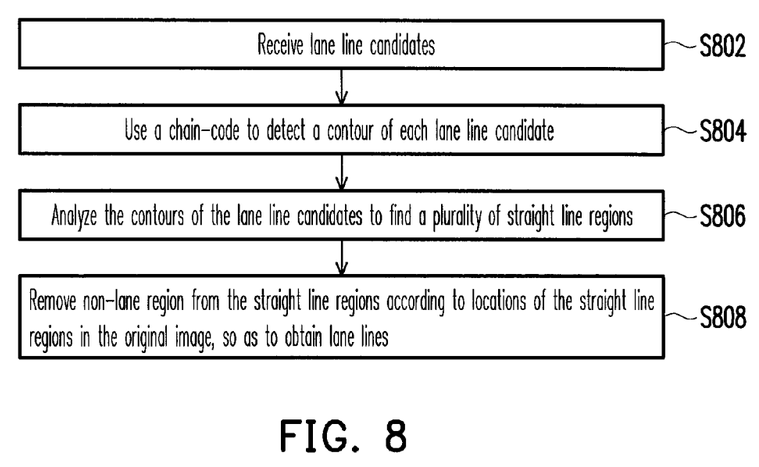
FIG. 8 is a flow chart of a lane line determination method according to an embodiment of the disclosure.

In view of the above, the lane line determination in this embodiment mainly includes determining lane lines through information on locations of the lane lines in the original image, so as to avoid erroneous determination of lane lines. In particular, FIG. 8 is a flow chart of a lane line determination method according to an embodiment of the disclosure. Referring to FIG. 8, in this embodiment, after the lane line candidates judged previously are received (Step S802), a chain-code is used to detect a contour of each lane line candidate (Step S804), and then the contours are analyzed to find straight line regions (Step S806). Finally, at least one non-lane region is removed from the straight line regions according to locations of the straight line regions in the original image, so as to obtain a plurality of lane lines (Step S808). In this embodiment, for example, straight line regions above the road are removed, so as to exclude straight line regions that cannot be lane lines, thereby avoiding errors in lane line determination.

It should be noted that, in addition to the locations of the lane lines, other conditions such as slopes of the lane lines are further taken into consideration in this embodiment to comprehensively judge the final lane lines, which is not limited herein.

Referring back to FIG. 3, after the lane line determination module 33 implements lane line detection, the lane departure judgment module 34 distinguishes the determined lane lines into at least one left lane line and at least one right lane line (Step S408), and analyzes a variation of an angle between each left lane line and a horizontal line and a variation of an angle between each right lane line and the horizontal line, for the warning system 30 to judge whether departure from a lane occurs, and the warning module 35 sends a lane departure warning (Step S410).

In particular, when the lane departure judgment module 34 distinguishes left and right lane lines, for example, a midpoint of a base of the original image is used as a reference for distinguishing the lane line regions, in which when an intersection point of the lane line region and the base is on the left of the midpoint, the lane line region is determined as a left lane line; on the contrary, when the intersection point of the lane line region and the base is on the right of the midpoint, the lane line region is determined as a right lane line.

Figure 9:
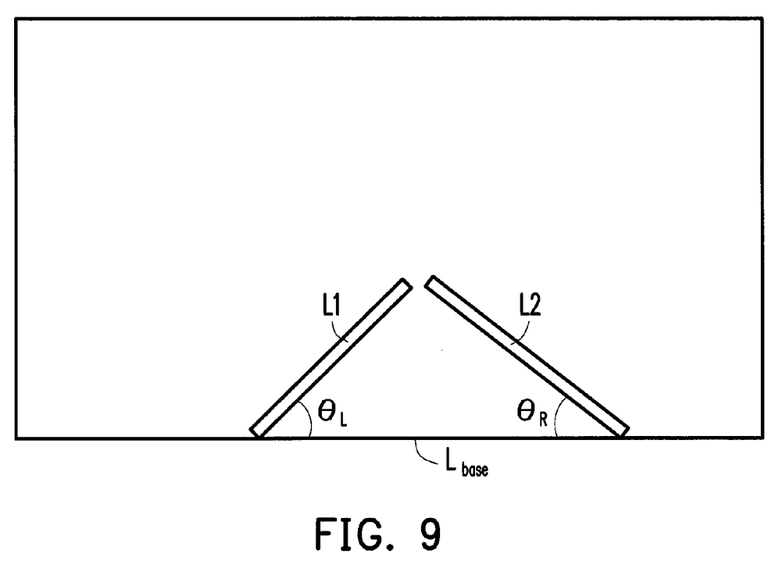
FIG. 9 shows an example of judging lane departure based on an angle of a lane line according to an embodiment of the disclosure.

In addition, to meet the requirement of judging whether the vehicle departs through one frame, the disclosure provides an algorithm for making judgment based on an "angle of a lane line". For example, FIG. 9 shows an example of judging lane departure based on an angle of a lane line according to an embodiment of the disclosure. Referring to FIG. 9, in the judgment of whether departure from a lane line occurs in this embodiment, it is judged whether the vehicle departs, for example, by analyzing a variation of an angle $\theta_L$ between a left lane line $L_1$ and a base $L_{base}$ and a variation of an angle $\theta_R$ between a right lane line $L_2$ and the base $L_{base}$, in which the angles $\theta_L$ and $\theta_R$ between the left lane line $L_1$ and the right lane line $L_2$ and the base $L_{base}$ are both acute angles. The detailed judgment basis is shown in the following formula (3):

$$Frame_i = \begin{cases} \text{depart to the left} & \text{if } (\theta_L > Th_{Angle\_1} \& \theta_R < Th_{Angle\_2}) \\ \text{depart to the right,} & \text{if } (\theta_R > Th_{Angle\_1} \& \theta_L < Th_{Angle\_2}) \\ \text{normal state} & \text{else} \end{cases} \quad (3)$$

In particular, for the $i^{th}$ frame $Frame_i$, the lane departure judgment module 34, for example, compares the angle $\theta_L$ between the left lane line $L_1$ and the base $L_{base}$ and the angle $\theta_R$ between the right lane line $L_2$ and the base $L_{base}$ with an angle threshold $Th_{Angle\_1}$ and an angle threshold $Th_{Angle\_2}$ respectively. When the angle $\theta_L$ of the left lane line $L_1$ is greater than the angle threshold $Th_{Angle\_1}$ and the angle $\theta_R$ of the right lane line $L_2$ is smaller than the angle threshold $Th_{Angle\_2}$, it is determined that departure to the left occurs; on the contrary, when the angle $\theta_R$ of the right lane line $L_2$ is greater than the angle threshold $Th_{Angle\_1}$ and the angle $\theta_L$ of the left lane line $L_1$ is smaller than the angle threshold $Th_{Angle\_2}$, it is determined that departure to the right occurs.

It should be noted that, in the above embodiment, the left lane line and the right lane line closest to a midline of the original image are used to judge whether departure from the lane occurs. However, in another embodiment, all determined lane lines (including a plurality of left lane lines and a plurality of right lane lines) may also be used to comprehensively judge whether the vehicle departs from the lane, which is not limited herein.

Figure 10:
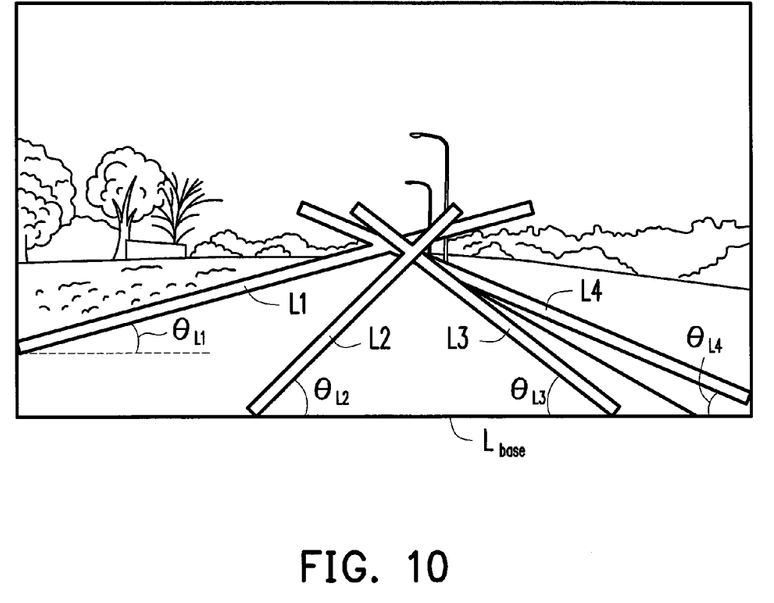
FIG. 10 shows an example of judging lane departure based on an angle of a lane line according to an embodiment of the disclosure.

For example, FIG. 10 shows an example of judging lane departure based on an angle of a lane line according to an embodiment of the disclosure. Referring to FIG. 10, in the judgment of whether the vehicle departs from the lane line in this embodiment, it is comprehensively judged whether the vehicle departs from the lane line, for example, by analyzing a variation of angles $\theta_{L1}$ and $\theta_{L2}$ between left lane lines $L_1$ and $L_2$ and the base $L_{base}$ (or a horizontal line) and a variation of angles $\theta_{R1}$ and $\theta_{R2}$ between right lane lines $L_3$ and $L_4$ and the base $L_{base}$ (or the horizontal line), and the judgment result, namely, Normal state, is displayed on the upper left corner of the screen.

To sum up, the method and the system for lane departure warning in the disclosure can detect various types of lane lines by combining "image segmentation" and "gradient analysis". In addition, the lane departure detection system in the disclosure can meet the requirements of "lane line detection" and "lane departure detection" at the same time, which can judge whether the vehicle departs through just one frame without analyzing the variation of continuous frames.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for lane departure warning, applicable to an electronic device, the method comprising:
   segmenting an original image into a plurality of regional images;
   analyzing a plurality of characteristics of each of the regional images, and accordingly removing at least one non-lane line region from the regional images, so as to obtain a plurality of lane line candidates;
   determining a plurality of lane lines from the lane line candidates according to a location of each of the lane line candidates in the original image;
   distinguishing the lane lines into at least one left lane line and at least one right lane line; and
   analyzing a variation of an angle between each of the at least one left lane line and the at least one right lane line and a horizontal line, so as to judge whether the electronic device departs from a lane and send a lane departure warning, wherein the step of analyzing the variation of the angle between each of the at least one left lane line and the at least one right lane line and the horizontal line, so as to judge whether the electronic device departs from the lane comprises:
      comparing the angle of each of the at least one left lane line and the angle of each of the at least one right lane line with a first angle threshold and a second angle threshold respectively;
      when the angle of the left lane line is greater than the first angle threshold and the angle of the right lane line is smaller than the second angle threshold, determining that departure to the left occurs; and
      when the angle of the right lane line is greater than the first angle threshold and the angle of the left lane line is smaller than the second angle threshold, determining that departure to the right occurs.

2. The method for lane departure warning according to claim 1, wherein the step of segmenting the original image into the plurality of regional images comprises:
   calculating a histogram illustrating a distribution of pixel values of a plurality of pixels in the original image; and
   performing a grouping process on the histogram, and restoring a result of the grouping process to the original image, so as to obtain the regional images.

3. The method for lane departure warning according to claim 1, wherein the step of analyzing the characteristics of each of the regional images, and accordingly removing the at least one non-lane line region from the regional images, so as to obtain the lane line candidates comprises:
   detecting a plurality of lane markers in each of the regional images, and classifying the lane markers into a strong edge, a soft edge, or a non-edge according to a gradient value of each of the lane markers; and
   analyzing at least one characteristic of the lane markers classified as the strong edge or the soft edge, and accordingly removing the at least one non-lane line region from the lane markers, so as to obtain the lane line candidates.

4. The method for lane departure warning according to claim 3, wherein the step of classifying the lane markers as the strong edge, the soft edge, or the non-edge according to the gradient value of each of the lane markers comprises:
   using a plurality of different gradient thresholds to distinguish the lane markers into the strong edge, the soft edge, or the non-edge for the lane markers of different categories.

5. The method for lane departure warning according to claim 3, wherein the step of analyzing the at least one characteristic of the lane markers classified as the strong edge or the soft edge, and accordingly removing the at least one non-lane line region from the lane markers, so as to obtain the lane line candidates comprises:
   calculating a first ratio of a maximum value to a minimum value in the width and the height of each of the lane markers;
   calculating a second ratio of a pixel number of each of the lane markers to the width and the height;

judging whether the first ratio is greater than a first threshold and whether the second ratio is greater than a second threshold;
if yes, determining that the lane marker is a lane line candidate; and
if not, deteiiiiining that the lane marker is a non-lane line region.

6. The method for lane departure warning according to claim 5, wherein the step of analyzing the characteristics of the lane markers classified as the strong edge or the soft edge, and accordingly removing the at least one non-lane line region from the lane markers, so as to obtain the lane line candidates further comprises:
using connected component labeling to label the lane markers that are connected as the same lane marker.

7. The method for lane departure warning according to claim 1, wherein the step of determining the lane lines from the lane line candidates according to the location of each of the lane line candidates in the original image comprises:
using a chain-code to detect a contour of each of the lane line candidates;
analyzing the contours of the lane line candidates to find a plurality of straight line regions; and
removing at least one non-lane region from the straight line regions according to locations of the straight line regions in the original image, so as to obtain the lane lines.

8. The method for lane departure warning according to claim 1, wherein the step of distinguishing the lane lines into the at least one left lane line and the at least one right lane line comprises:
distinguishing each of the lane line regions by using a midpoint of a base of the original image as a reference, wherein when an intersection point of the lane line region and the base is on the left of the midpoint, the lane line region is determined as a left lane line; and
when the intersection point of the lane line region and the base is on the right of the midpoint, the lane line region is determined as a right lane line.

9. The method for lane departure warning according to claim 1, wherein lane lines for judging whether the electronic device departs from the lane are a left lane line and a right lane line closest to a midline of the original image, and the angle of the left lane line and the angle of the right lane line are acute angles.

10. A system for lane departure warning, comprising:
an image segmentation module, for segmenting an original image into a plurality of regional images;
a lane line region detection module, for analyzing a plurality of characteristics of each of the regional images, and accordingly removing at least one non-lane line region from the regional images, so as to obtain a plurality of lane line candidates;
a lane line determination module, for determining a plurality of lane lines from the lane line candidates according to a location of each of the lane line candidates in the original image;
a lane departure judgment module, for distinguishing the lane lines into at least one left lane line and at least one right lane line, and analyzing a variation of an angle between each of the at least one left lane line and the at least one right lane line and a horizontal line, so as to judge whether departure from a lane occurs, wherein the lane departure judgment module comprises comparing the angle of each of the at least one left lane line and the angle of each of the at least one right lane line with a first angle threshold and a second angle threshold respectively, wherein when the angle of the left lane line is greater than the first angle threshold and the angle of the right lane line is smaller than the second angle threshold, it is determined that departure to the left occurs; and when the angle of the right lane line is greater than the first angle threshold and the angle of the left lane line is smaller than the second angle threshold, it is determined that departure to the right occurs; and
a warning module, for sending a lane departure warning when the lane departure judgment module judges that departure from the lane occurs.

11. The system for lane departure warning according to claim 10, wherein the image segmentation module comprises calculating a histogram illustrating a distribution of pixel values of a plurality of pixels in the original image; and performing a grouping process on the histogram, and restoring a result of the grouping process to the original image, so as to obtain the regional images.

12. The system for lane departure warning according to claim 10, wherein the lane line region detection module comprises:
a lane marker detection unit, for detecting a plurality of lane markers in each of the regional images, and classifying the lane markers into a strong edge, a soft edge, or a non-edge according to a gradient value of each of the lane markers; and
a lane marker filtering unit, for analyzing at least one characteristic of the lane markers classified as the strong edge or the soft edge, and accordingly removing the at least one non-lane line region from the lane markers, so as to obtain the lane line candidates.

13. The system for lane departure warning according to claim 12, wherein the lane marker detection unit further comprises using a plurality of different gradient thresholds to distinguish the lane markers into the strong edge, the soft edge, or the non-edge for the lane markers of different categories.

14. The system for lane departure warning according to claim 12, wherein the lane marker filtering unit comprises:
calculating a first ratio of a maximum value to a minimum value in the width and the height of each of the lane markers;
calculating a second ratio of a pixel number of each of the lane markers to the width and the height;
judging whether the first ratio is greater than a first threshold and whether the second ratio is greater than a second threshold;
if yes, detennining that the lane marker is a lane line candidate; and
if not, determining that the lane marker is a non-lane line region.

15. The system for lane departure warning according to claim 14, wherein the lane marker filtering unit futher comprises using connected component labeling to label the lane markers that are connected as the same lane marker.

16. The system for lane departure warning according to claim 10, wherein the lane line determination module comprises using a chain-code to detect a contour of each of the lane line candidates, analyzing the contours of the lane line candidates to find a plurality of straight line regions, and removing at least one non-lane region from the straight line regions according to locations of the straight line regions in the original image, so as to obtain the lane lines.

17. The system for lane departure warning according to claim 10, wherein the lane departure judgment module comprises distinguishing each of the lane line regions by using a midpoint of a base of the original image as a reference, wherein when an intersection point of the lane line region and the base is on the left of the midpoint, the lane line region is determined as a left lane line; and when the intersection point of the lane line region and the base is on the right of the midpoint, the lane line region is determined as a right lane line.

18. The system for lane departure warning according to claim 10, wherein lane lines for judging whether departure from the lane occurs are a left lane line and a right lane line closest to a midline of the original image, and the angle of the left lane line and the angle of the right lane line are acute angles.

* * * * *